Dec. 15, 1959  S. A. WETTY  2,917,092
HAND-HELD TOOL
Filed Oct. 9, 1957  2 Sheets-Sheet 1
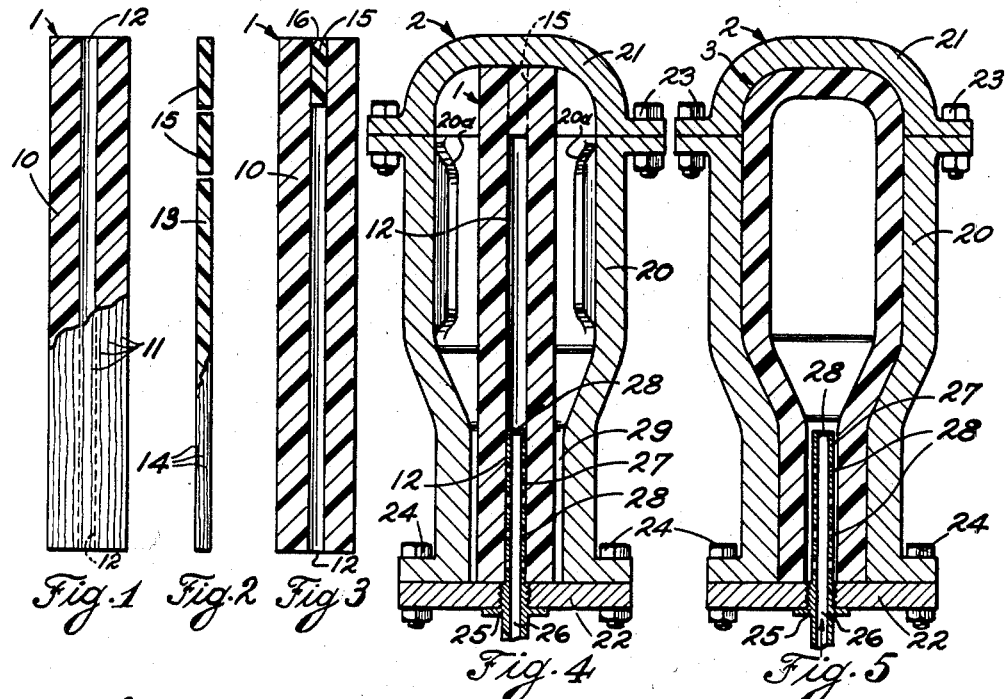
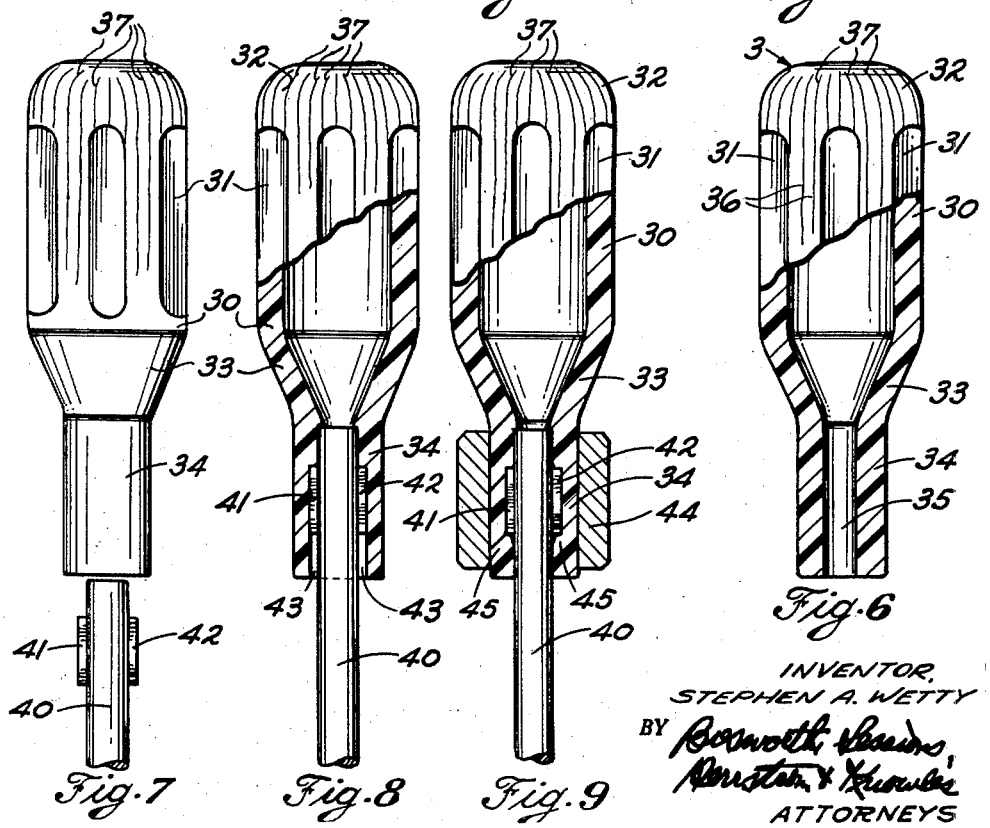
INVENTOR.
STEPHEN A. WETTY
BY
ATTORNEYS Dec. 15, 1959
S. A. WETTY
2,917,092
HAND-HELD TOOL
Filed Oct. 9, 1957
2 Sheets-Sheet 2
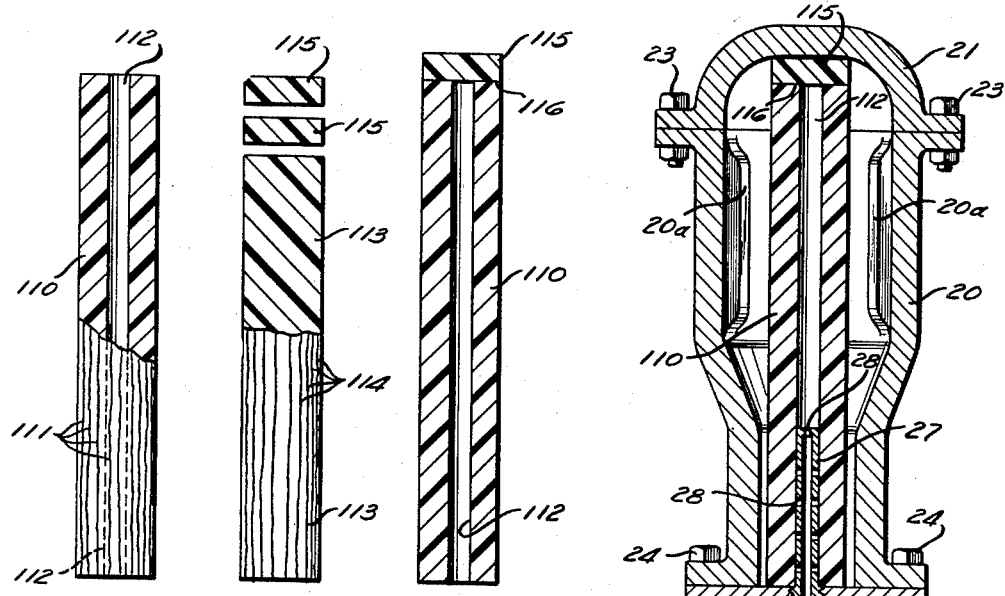
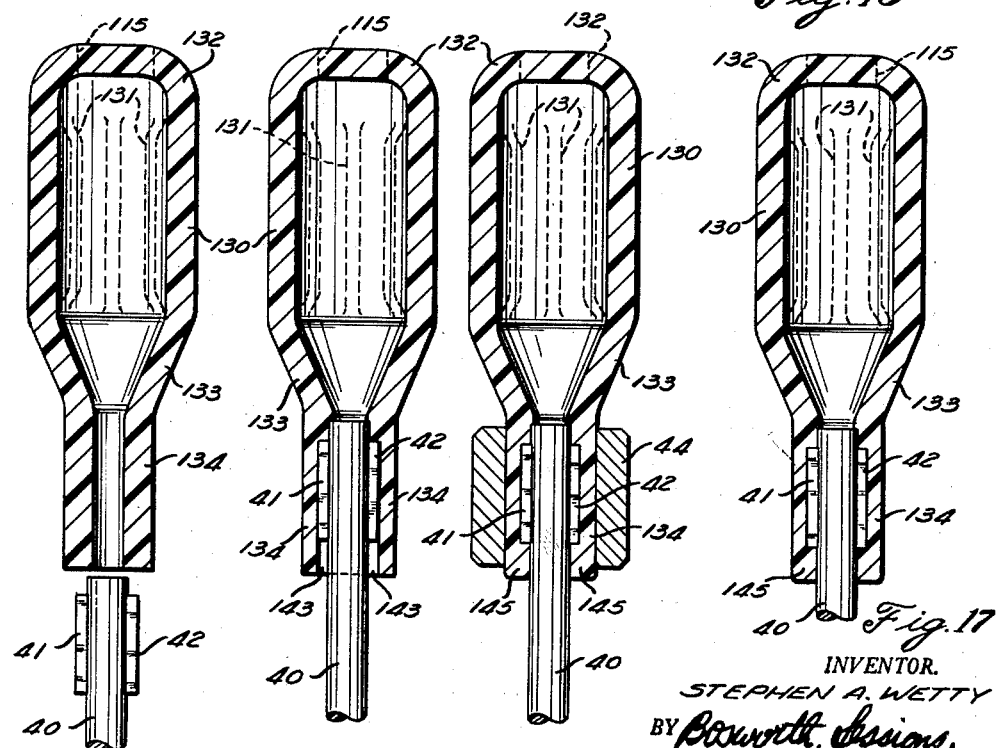
INVENTOR.
STEPHEN A. WETTY
BY Bosworth, Sessions,
Herrstrom & Knowles
ATTORNEYS

United States Patent Office 2,917,092
Patented Dec. 15, 1959

2,917,092

HAND-HELD TOOL

Stephen A. Wetty, Royersford, Pa., assignor to S. A. Wetty & Sons, Inc., Royersford, Pa., a corporation of Pennsylvania Application October 9, 1957, Serial No. 689,166

4 Claims. (Cl. 145—61)

This invention relates to a hand-held tool such as a screw driver, chisel, awl or the like, particularly a tool of this kind provided with a synthetic resin handle of improved resistance to endwise impact.

Because nearly every user of a hand-held tool subjects it at least occasionally to a particularly heavy blow on the end of the handle, as by means of a mallet, claw hammer, mechanic's hammer or the like, it is commonplace to make the handle of what is described as "impact-resistant resin." Available for the purpose at the present time is a variety of synthetic resins that have good impact resistance properties as measured by the Izod notch test, among them the cellulosic resins, the polyethylene resins, and the polyfluoroethylene resins. When consideration is given to other desirable physical characteristics, such as compressive strength, flexural strength and transparency, the choice usually tends to narrow down to the cellulosic resins. At present, the latter have the further advantage of being the least expensive of the above-mentioned synthetic resins.

For these reasons, the cellulosic resins, especially cellulose nitrate, cellulose acetate, cellulose propionate, cellulose acetate butyrate and ethyl cellulose, are widely used in tool handles. Because they are thermoplastic, easy to work, and easy to mold, tool handles made from them can be and usually are formed in a simple split mold. The common molding procedures are very widely used; viz., compression molding, transfer molding and ejection molding. In the product, the physical characteristics, including impact resistance, tend to be uniform. As a rule, there is no grain structure in the product; if there is, it is random in its nature.

On the other hand, when formed into products by extrusion processes, these and other thermoplastic resins tend to develop grain orientation in a direction paralleling the direction of extrusion. This results in a certain amount of non-uniformity of physical characteristics over the surface of the product. Thus a short length of rod that has been formed by an extrusion process gives impact resistance values along its sides that tend to be inferior to those obtained by measuring impact resistance on sections taken at right angles to the direction of extrusion. However, in solid objects such as mallet heads, advantage can occasionally be taken of this fact to locate the zones of maximum impact resistance where maximum benefits are derived from them, as, for example, at the two ends of the mallet head.

Because of the cost of the synthetic resins employed in these and like processes, including the cellulosic resins, it is highly desirable that tool handles made from them be left hollow if it is practicable to leave them hollow. This consideration commonly dictates reliance upon an operation involving casting, compression molding, transfer molding or injection molding into a mold equipped with an insert designed to provide the desired hollow. For reasons already pointed out, the impact resistance values of the products are uniform but low as compared with the best values obtainable in extruded products.

Tool handles provided with central openings for storing bits and the like can also be made from rod by drilling or otherwise removing the material at the center, but this is an expensive step the cost of which is almost never offset by the recovery and re-use of the material taken from it. Therefore, in cases in which a tool handle is being made, it has usually been preferred to leave a surplus of material at the center, foregoing any central opening unless it has been imperative to provide one.

These and similar considerations, particularly the practical advantages inherent in the presence of high impact values where the effect of impact is most likely to be felt, have given rise to the present invention, which deals with a tool of the kind described having a mechanically engaged handle of synthetic resin that was extruded in the first instance in the form of a tube, then bridged at one end by a cap or plug of impact-resistant material, and thereafter formed into a handle body. The effect of bridging the end of the tube by means of a cap or plug of impact-resistant material is to enhance the impact resistance. For this purpose, the bridge may comprise a cap or plug of extruded synthetic resin of the same composition as or, if desired, of a chemical composition different from that characterizing the rest of the handle body, utilizing the additional impact-resistant material of the bridge with a view to increasing the total impact resistance of the handle end.

According to the present invention, the handle is molded from tubular stock by expanding a tubular work piece in a mold by means of a pressure fluid introduced while the blank is in workable condition and then causing the product to rigidify or "set." Where, as in the usual case, the handle is long in relation to its breadth, it is practicable to bridge the end of the tubular blank used in making up the work piece, employing as the bridge a cap or plug of extruded thermoplastic resin having characteristics generally similar to those of the extruded thermoplastic resin of which the blank itself is formed. In this way a work piece is obtained which, when molded as described in more detail hereinafter, gives a handle having at its outer end particularly good impact resistance values.

Other objects and advantages of the invention will be apparent from the description which follows and from the accompanying drawings, in which:

Figure 1 is an elevation of the tubular blank with its upper half broken away to reveal its section;

Figure 2 is a like view of an extruded rod showing parts severed from it for use as plugs;

Figure 3 is a section through the work piece showing the plug in place but not yet fused to the blank;

Figure 4 is a diagrammatic section showing the work piece in position in a suitably shaped mold designed to form it into a tool handle;

Figure 5 is a diagrammatic section through the same mold after completion of the step of molding the work piece to form it into a tool handle;

Figure 6 is a section through the molded product, the upper portion thereof being shown in elevation;

Figure 7 is an elevation of the tool handle and the proximate end of the tool shank before the introduction of the shank into the handle;

Figure 8 is a section with the upper portion thereof in elevation showing the tool handle as it appears immediately after the introduction of the tool shank;

Figure 9 is a section with the upper portion thereof in elevation illustrating how the tool handle is pressed onto the tool shank;

Figure 10 is a section through a tubular blank utilized in a modification in which a cap is employed rather than a plug;

Figure 11 is a section through an extruded rod severed in part into discs for use for capping purposes;

Figure 12 is a section through the work piece showing the cap cemented in place on the end of the tubular blank;

Figures 13, 14, 15 and 16 correspond, respectively, to Figures 4, 7, 8 and 9; and Figure 17 is a section through the completed tool.

In the drawings two ways in which the invention may be practiced are illustrated. Figures 1 to 6 show how a tubular work piece 1, made as indicated in Figures 1 to 3, may be expanded in a mold 2 (Figures 4 and 5) so as to give the intermediate product 3 (Figure 6). This intermediate product takes the form of a handle into which the tool shank may later be introduced as shown in Figures 7 to 9. Figures 10 to 17 show how a tubular blank may be capped and formed into a hand tool.

Work piece 1, shown in three different stages in Figures 1, 3 and 4, is made up by taking a tubular blank 10 of extruded thermoplastic resin, introducing into one end thereof a plug 15 of a compatible thermoplastic resin, preferably a plug formed from an extruded rod of cylindrical cross section of the same composition as tubular blank 10, and uniting the two to provide a bridged tubular work piece having one closed end. Such work piece is unitary and, if formed as hereinafter described, is integral for all practical purposes from one end thereof to the other.

In almost every tubular blank of extruded thermoplastic resin that has not been heated to too high a temperature there is an invisible grain that is oriented in a direction which in general parallels the longitudinal axis of the blank. It is a result of this orientation that the impact resistance of the blank is so much greater at its ends than over the intervening surfaces. In order to illustrate the grain structure in the drawings, grain lines 11 are shown in Figure 1, although it should be understood that the grain structure does not manifest itself by grain lines visible to the unaided eye. The presence of the grain and the direction of its orientation are matters which can be ascertained only by means of microscopes and like test facilities.

For the purposes of the present invention, the grain should preferably run parallel or nearly parallel to the central axis of the blank in the manner diagrammatically indicated by grain lines 11. In order that this state of affairs may obtain, tubing or pipe that has been made by extruding thermoplastic resin is used as the starting material. It is first cut into lengths of suitable size, usually measuring from about 2″ as a minimum to about 8″ as a maximum. In the case of the blank 10 shown in Figure 1, the full-size blank measures about 4″ in length by about ⅝″ in diameter and has a central opening 12 with a diameter of about ⅛″.

Where, as in the blank of Figure 1, the opening 12 is small in diameter as compared with the diameter of the blank itself, it is not necessary that such opening be bridged by an extruded thermoplastic resin plug of the same composition; instead, a plug of a compatible thermoplastic resin, with or without a demonstrable grain structure, may be used. Preferably, however, the plug is made from a rod such as the cylindrical rod 13 (Figure 2) which is formed by a process of extrusion from the same or substantially the same thermoplastic resin as blank 10. An extruded rod usually has a grain oriented in a direction which roughly parallels the longitudinal axis of the rod. This grain structure cannot be detected by the unaided eye but is illustrated diagrammatically by means of grain lines 14. Just as in the case of blank 10, sections of rod 13 show their maximum resistance to impact at their ends rather than over the surfaces which separate them.

If, as assumed, blank 10 has a central opening 12 measuring about ⅛″ in diameter, rod 13 should not exceed ⅛″ in diameter and to advantage may be very slightly less, this so as to facilitate its use for plugging. Two plugs 15, each measuring ½″ or so from end to end, are shown near the top of Figure 2 as they appear when severed from rod 13. In preparing the work piece for molding, a plug 15 from a rod 13 of suitable diameter is introduced into and fixed in place in any convenient way in the upper end of opening 12 in blank 10: see Figure 3. For example, plug 15 may, if desired, be forced into opening 12 and held in place by a friction fit provided the diameters of opening 12 and plug 15 are so related to each other as to permit it. Ordinarily, however, plug 15 will be cemented in place by means of a thin film of a suitable liquid cement or fused to blank 10 by means of a mutual solvent; i.e., a solvent capable of acting simultaneously on blank 10 and plug 15. The latter, which constitutes a preferred way of holding plug 15 in place in blank 10, gives a work piece that is virtually integral from end to end. The cement or solvent, as the case may be, is indicated at 16 in Figure 3.

In the preferred form of the iniventon, in which a mutual solvent is used to cause plug 15 to weld to blank 10, the solvent is applied both to the inside cylindrical surface of blank 10 and to the outside cylindrical surface of plug 15. In such circumstances, there is a certain amount of softening of the respective surfaces before they are brought into contact wtih each other. This softening continues for a while after plug 15 is inserted in tubular blank 10 but after a few mnutes, during which the fusion process takes place, the common solvent evaporates, giving a unitary work piece closed at one end by a plug which can no longer be identified as such, particularly if the end faces of tubular blank 10 and plug 15 are flush with each other. In Figure 4, which shows the work piece in place in mold 2, plug 15 is indicated by dotted lines without any distinctive cross hatching.

As shown in Figure 4, work piece 1 appears to be rigid; however, before work piece 1 is introduced into mold 2 it must be softened until it becomes workable, usually by heating to a temperature between about 200 and about 325 degrees F. Temperatures much in excess thereof, as, for example, a temperature of 400 degrees F., tend to destroy the grain structure in work pieces formed of extruded thermoplastic resins of the types most likely to be used for the purposes of the invention. The heating step, which in practice is likely to be done in a continuous furnace, should not be carried beyond the point at which the work piece 1 becomes workable. While in this condition, work piece 1 is introduced into mold 2. If there is a delay in introducing the work piece into the mold, the work piece will tend to set as it loses heat to the surroundings, after which it may no longer be sufficiently workable for the purpose of the invention.

In practice, the mold is likely to be made of two or more mating platens which, fitted together, provide a number of like mold cavities that are interconnected with each other by runners; however, in illustrating the invention it is simpler to show the mold as consisting of a body portion 20, a top portion 21, and a bottom portion 22. Top portion 21 is shown as held to body portion 20 by fastening means 23; bottom portion 22 is shown as held to body portion 20 by fastening means 24. In practice, fastening means 23 and 24, where such are required, are likely to take the form of quick-detachable fastening elements such as pivoted tie rods surmounted by wing nuts, the tie rods cooperating in conventional fashion with slots in the flanges on the respective mold portions.

Body portion 20, for the purpose of giving work piece 1 the shape of a tool handle, is characterized by upper and lower cylindrical or substantially cylindrical portions separated by a merging portion of frusto-conical shape. On its inner surface, the upper cylindrical portion is provided with integrally formed ribs 20a. The latter form flutes in the exterior surface of the tool handle. In conformity with conventional molding practice, the upper and lower cylindrical parts of body portion 20 should have a slight upward flare ("draft") to facilitate removal of the product from the body portion of the mold after the molding operation has been completed. Such may or may not be necessary if the mold is split lengthwise on a plane passing through its axis of figure, as is usually the case in plant practice.

Bottom portion 22 is preferably provided with a detachable fitting 25 having therein an opening 26 through which a pressure fluid may be introduced into the mold. Extending into the interior of work piece 1 from the inner end of fitting 25 is an integrally formed nozzle 27 provided with orifices 28 for directing the pressure fluid upwardly into that part of opening 12 lying above the end of nozzle 27 and laterally against the adjacent surfaces in the lower portion of the work piece. Between the lower portion of work piece 1 and the lower cylindrical portion of the mold is a clearance 29, shown in exaggerated fashion in Figure 4. Some clearance will normally be present, but it will ordinarily be less than that shown, this so as to require the work piece to align itself with fitting 25. Clearances elsewhere in the mold normally will be approximately as shown, there being of necessity substantial clearances between mold 2 and work piece 1 where ribs 20a project inwardly into the mold cavity.

Before work piece 1 has had an opportunity to lose so much heat that it is no longer easily workable, compressed air or other pressure fluid is introduced into the lower end of workpiece 1 through fitting 25. The pressure fluid so introduced may be at any convenient pressure above about 25 or 30 lbs. per square inch; for example, it may be a pressure of 50 lbs., 100 lbs. or even 1000 lbs. per square nich. Primarily, the introduction of the pressure fluids is for the purpose of expanding work piece 1 into intimate contact with the inside surface of mold 2. At this stage, work piece 1 assumes the shape and proportions of the mold to form intermediate product 3; that is to say, the tool handle which is being molded in the process.

If at or near room temperatures, the pressure fluid so introduced into the interior of work piece 1 serves to rigidify or "set" the resin, making it possible to dispense with any separate cooling or quenching step. After this much has been done, which is usually a matter of only a few seconds after the mold parts are closed around the work piece, the product can be withdrawn by opening the mold and ejecting it in any convenient way. At this stage, the product is at a temperature well below that at which the resin softens but it nevertheless has a perceptible warmth.

Where, as in Figures 1 to 9, the invention is being used in making a tool handle, the intermediate product 3 then has the appearance illustrated in Figure 6. The body or upper cylindrical portion 30, which is the portion grasped by the fingers in using the tool, has flutes 31 where ribs 20a projected into the mold cavity. It is surmounted by a dome-like portion 32 conforming generally to the palm of the human hand. Below the upper cylindrical portion 30 is the frusto-conical portion 33; below it, the lower cylindrical portion 34. The latter is of considerably smaller diameter than upper cylindrical portion 30. In it is an elongated opening 35 measuring approximately ¼" in diameter for reception of the shank of the tool. The walls of the tool handle will usually be uniform or nearly uniform in thickness, as shown, although there is no particular disadvantage to non-uniformity so long as there is ample material in the walls to enable the tool handle to stand up in use.

A tool handle such as that shown in Figure 6 may be used for a screw driver, a chisel, an awl or in any similar hand-held tool. Tools of this sort are not infrequently called upon to absorb the shock of a hammer blow on the end of the tool handle. The impact of a hammer blow applied to the end of the ordinary tool handle is often sufficient to split it, if of wood, or to chip or otherwise mar it if it is of a synthetic resin, hard rubber or the like. By contrast, the high impact resistance possessed by blank 10 and rod 13 are retained in the plug-bridged tool handle of the present invention, permitting it to stand up to much better advantage under abuse, as, for example, under a blow by a heavy hammer.

In the case of tool handles formed as indicated in Figures 1 to 5, the original grain in blank 10, which grain is shown at 36 in Figure 6, persists notwithstanding reheating of the extruded thermoplastic resin used in blank 10. Expansion of work piece 1 from the form shown in Figure 3 to that shown in Figure 5 does not greatly change the grain structure except that in rounded portion 32 and also in frusto-conical portion 33 of the tool handle the grain can be shown by microscopic examination to conform to the shape given to the tool handle in the mold. This is indicated in diagrammatic fashion by grain lines 37 in rounded portion 32.

The ordinary tool handle made of synthetic resin is formed by casting, compression molding, transfer molding or injection molding, none of which gives the orientation of grain that is found in a product which can be made by a process of extrusion; e.g., tubing, pipe, rod, etc. For reasons already explained, tool handles made by prior processes have usually had to be solid except where inserts have been used in the mold or, in other cases, where they have been drilled or tapped for the reception of the tool shank. In many cases, therefore, there has been unneeded material at the center of the tool handle which has contributed to the weight and cost but has done nothing to make the tool handle better in any significant way than if it were hollow. In addition to providing the previously mentioned advantages, the tool handle of the present invention is without excess material at the center to add to the weight and cost.

In attaching the tool handle to the tool shank, it is feasible to follow the sequence of steps illustrated in Figures 7 to 9, although some other sequence of the same or different steps may be used if desired. Thus one may take a tool shank 40 provided with handle-engaging means in the form of ears 41 and 42, such ears being introduced in the process of making the tool shank as by forging or otherwise striking the ears out of the stock of which the tool shank is formed. Preparatory to introducing shank 40 into the tool handle, the latter is reheated sufficiently to soften lower cylindrical portion 34, after which tool shank 40 is forced endwise into opening 35. This can usually be done without difficulty, either manually or by means of a machine.

If, as is usually the case, opening 35 in lower cylindrical portion 34 is of a diameter slightly smaller than the diameter of tool shank 40, ears 41 and 42 will force their way into the material of the side walls of lower cylindrical portion 34 and the end of tool shank 40 will force any surplus material ahead of it into the cavity in the tool handle, where such surplus material can remain. If, on the other hand, opening 35 is slightly larger than the diameter of tool shank 40, ears 41 and 42 will nevertheless force their way into the material of the side walls of lower cylindrical portion 34. In either case, ears 41 and 42 will leave behind them channel-like openings 43 (Figure 8) which should be closed in some convenient way.

One way of doing this is to press lower cylindrical portion 34 into contact with tool shank 40 while the material of lower cylindrical portion 34 is still workable. In the preferred method of practicing the invention, a split collar 44 is closed around lower cylindrical portion 34 as shown in Figure 9, thus urging lower cylindrical portion 34 into more intimate contact with the tool shank. In the process, part of the material of lower cylindrical portion 34, indicated at 45, flows into the channel-like openings 43 below ears 41 and 42. When the resin rigidifies, this material prevents retraction of the tool handle by interfering with ears 41 and 42. Thus shank 40 is held in place in lower cylindrical portion 34 without freedom to move into or out of the tool handle or even to turn to a different angular position.

Figures 10 to 17 illustrate how a tool handle may be made by capping a tubular blank of extruded thermoplastic resin to form a work piece that can be expanded in a mold of the type shown in Figures 4 and 5. Tubular blank 110 is similar to blank 10 of Figure 1, being characterized by the non-visible grain orientation indicated at 111 and a central bore 112. In capping it, use is made of a rod 113 of extruded thermoplastic resin characterized by the non-visible grain orientation indicated at 114. Rod 113 is cut transversely to its axis to form capping disks 115. As illustrated in Figure 12, one of these disks can be used to bridge the opening 112 in blank 110. It may, if desired, be fused to the blank, but in the embodiment of the invention shown, is bonded to it. If a cement rather than a mutual solvent is used to hold disk 115 in place on blank 110, there is a visible area of demarcation, indicated in Figure 12 at 116.

The work piece so made up is positioned as before in a suitable mold and, while still workable, is expanded as already described to cause it to conform to the interior of the mold.

By the time this has been done, disk 115 has lost its separate identity and has become integral or virtually integral with the rest of the handle body, giving a product analogous to that shown in Figure 6. Disk 115 is accordingly shown in Figures 14 to 17 in dotted lines and crosshatched in the same manner as the other portions of the handle body. In general, the handle body consists of a wide, generally cylindrical portion 130 with the usual flutes 131 and a dome-like end 132, and immediate frusto-conical portion 133, and a narrow, generally cylindrical portion 134. Tool shank 40, in which ears 41 and 42 are provided to serve as handle-engaging means, is introduced into cylindrical portion 134 in the manner already described. Introduction of the tool shank causes the channel-like openings 143 (Figure 15) to develop. These are later closed as at 145 (Figure 16) when split collar 44 is brought to bear against cylindrical portion 134. The completed product is shown in Figure 17.

In both forms of the invention, but particularly in that shown in Figures 10 to 17, it is feasible to use a material of a distinctive color in forming the bridge portion of the handle body. Thus if the handle body as a whole is yellow, plug 15 may, if desired, be red, green, blue or black; under similar circumstances, disk 115 likewise may be red, green, blue or black. If the handle body as a whole is of dark color; e.g., dark brown, the plug or cap used to form the bridge may to advantage be of light colored stock; e.g., white or yellow. Conventional plastic colorants, including ordinary white pigments, may be used as desired. In the usual case, in which the blank is tinted yellow, a striking contrast can easily be developed between the bridge portion of the handle body and the portions of the handle body formed from the original tubular blank.

In making the tool handle, it is possible to use almost any of the many available thermoplastic resins that is rigid at ordinary temperatures. Preferred for the purposes of the invention is cellulose acetate butyrate, although cellulose acetate itself can be used for the purpose. So also can cellulose nitrate, ethyl cellulose, which has a particularly high resistance to impact and which is capable of maintaining its toughness and resilience over a wide temperature range, is likewise suitable. Noncellulosic resins may be used, among them polystyrene; the polyamides (nylon); the acrylic resins, particularly polymethylmethacrylate; and the various vinyl polymers, including polyvinyl chloride, polyvinyl acetate, and the polyvinyl acetals. In the step of fusing together the bridging element and the tubular blank, there may be used as mutual solvents such common solvents as acetone, methyl ethyl ketone, the various Cellosolves, and many others known to those skilled in the plastics art.

It is intended that the patent shall cover, by summarization in appended claims, all features of patentable novelty residing in the invention.

What is claimed is:

1. In a hand tool, a metal shank; means at one end of the shank serving as a tool; handle-engaging means at the opposite end of the shank; and a handle held in place by the handle-engaging means comprising a hollow handle body of thermoplastic resin consisting of a narrow portion cooperating with the handle-engaging means, an intermediate portion of intermediate width, and a wide portion spanned at its outer end by a bridge consisting of the solid residue of a discrete mass of thermoplastic resin, the grain orientation in the bridge typifying that characterizing extruded resins generally and paralleling the longitudinal axis of the handle body.

2. A hand-held tool as in claim 1 in which the bridge consists of the solid residue of a plug in the outer end of the wide portion.

3. A hand-held tool as in claim 1 in which the bridge consists of the solid residue of a cap on the outer end of the wide portion.

4. In a hand tool, a metal shank; means at one end of the shank serving as a tool; handle-engaging means at the opposite end of the shank; and a handle held in place by the handle-engaging means comprising a hollow handle body of an extruded cellulosic resin consisting of a narrow portion cooperating with the handle-engaging means, an intermediate portion of intermediate width, and a wide portion spanned at its outer end by a bridge consisting of the solid residue of a discrete mass of extruded cellulosic resin, the grain orientation in the bridge typifying that characterizing extruded resins generally and paralleling the longitudinal axis of the handle body.

References Cited in the file of this patent

UNITED STATES PATENTS

| | | |
|---|---|---|
| 1,904,290 | Neidich | Apr. 18, 1933 |
| 2,127,163 | Davis | Aug. 16, 1938 |
| 2,175,481 | Padulo | Oct. 10, 1939 |
| 2,176,698 | Albrecht | Oct. 17, 1939 |
| 2,202,253 | Hiatt | May 28, 1940 |
| 2,288,454 | Hobson | June 30, 1942 |
| 2,774,993 | Hagen et al. | Dec. 25, 1956 |